United States Patent

Roberts et al.

[11] 3,952,993
[45] Apr. 27, 1976

[54] DUAL RATE VALVE ASSEMBLY

[75] Inventors: David E. Roberts, Ann Arbor; Robert H. Wind, Grand Blanc, both of Mich.

[73] Assignee: General Motors Corporation, Detroit, Mich.

[22] Filed: July 22, 1974

[21] Appl. No.: 490,378

[52] U.S. Cl. .................................. 251/20; 303/40
[51] Int. Cl.² ........................................ F16K 21/16
[58] Field of Search ............. 251/20, 23, 25, 282, 251/15; 137/625.3, 84, 85, 513.3, 543.2; 303/40

[56] References Cited
UNITED STATES PATENTS

| | | | |
|---|---|---|---|
| 1,115,244 | 10/1914 | Reynolds | 137/513.3 |
| 1,885,363 | 11/1932 | Leitner | 137/513.3 |
| 2,783,020 | 2/1957 | Kleczek | 251/282 |
| 3,099,282 | 7/1963 | Miller et al. | 251/20 |
| 3,357,255 | 12/1967 | Reynolds | 137/85 |
| 3,648,968 | 3/1972 | Reid et al. | 251/282 |

FOREIGN PATENTS OR APPLICATIONS

| | | | |
|---|---|---|---|
| 222,667 | 10/1924 | United Kingdom | 251/23 |

*Primary Examiner*—Martin P. Schwadron
*Assistant Examiner*—George L. Walton
*Attorney, Agent, or Firm*—D. D. McGraw

[57] ABSTRACT

A valve assembly in an air brake truck system which meets minimum response time specifications required by authorities and the maximum response rate required by the wheel lock control system for efficient operation. The valve assembly varies the effective orifice size between the air supply inlet and the outlet to the relay valve. The high minimum specified rate is provided for a short period of time for initial response and the lower maximum rate for efficient operation is provided for the remainder of the stop. The valve assembly has a timing section and a variable orifice section. An initially effective large orifice area is provided by moving the valve from its rest or low rate position with an initial application of control pressure, and passing control pressure through a timing orifice to counterbalance the initially applied pressure in a desired short period of time, thereby permitting the valve to return to its first position which establishes a smaller effective orifice area through which the supply pressure flows. The valve is balanced by suitable balance ports and areas so that the operating conditions of the variable orifice section do not affect the operation of the timing section.

2 Claims, 2 Drawing Figures

TIMING SECTION     VARIABLE ORIFICE SECTION

DUAL RATE VALVE ASSEMBLY

The invention relates to a dual apply rate valve assembly and more particularly to one for use in fluid pressure braking systems such as truck air brake systems which have wheel lock controls. In recent years there have been many government requirements and specifications promulgated on vehicle systems. One such specification may result in the need for the initial response time in the air brake system of certain trucks to be at a minimum rate of 375 p.s.i./second. Systems developed to control the truck brakes have characteristics which are somewhat contradictory. One such system which may be used has a wheel lock control which requires a mximum response rate of 250 p.s.i./second for efficient operation. The opposed requirements must therefore be met sequentially in order to comply with the promulgated specification while operating the control system efficiently.

The desired action is obtained by use of the dual rate valve assembly embodying the invention. This assembly accomplishes its task by varying the effective orifice area between the supply chamber and the relay valve of the air brake system. The output or control pressure from the treadle valve to the control solenoid valve and the relay valve is used to control the effective orifice size such that the high rate is provided for about the first 250 milliseconds of the stop while the low rate is provided for the remainder of the stop or until the vehicle operator releases the brake.

The valve assembly is normally in the low rate position. This provides the advantage of being able to operate the controller at its optimum rate for best stopping distance and control should the dual rate valve assembly become inoperable to establish the high rate. By having the valve assembly so timed that the high rate occurs for only about 250 milliseconds, instead of about 2 seconds as occurs in previous dual rate valves, smaller control volumes and larger orifices can be used which result in smaller package size and less susceptibility to contamination. Another feature of the valve assembly embodying the invention is the automatic stroking of the valve assembly whether or not the wheel lock controller operates during a stop. This is accomplished by utilizing the control pressure directly from the treadle valve. By exercising the valve on each brake operation, its susceptibility to seizure due to inactivity is minimized. By operating the dual rate control valve assembly on the supply side of the relay valve, the orifice sizes controlling the rates are significantly larger than those in previous valves, improving the manufacturability of the valve in relation to those with smaller orifices.

IN THE DRAWING

Figure 1:
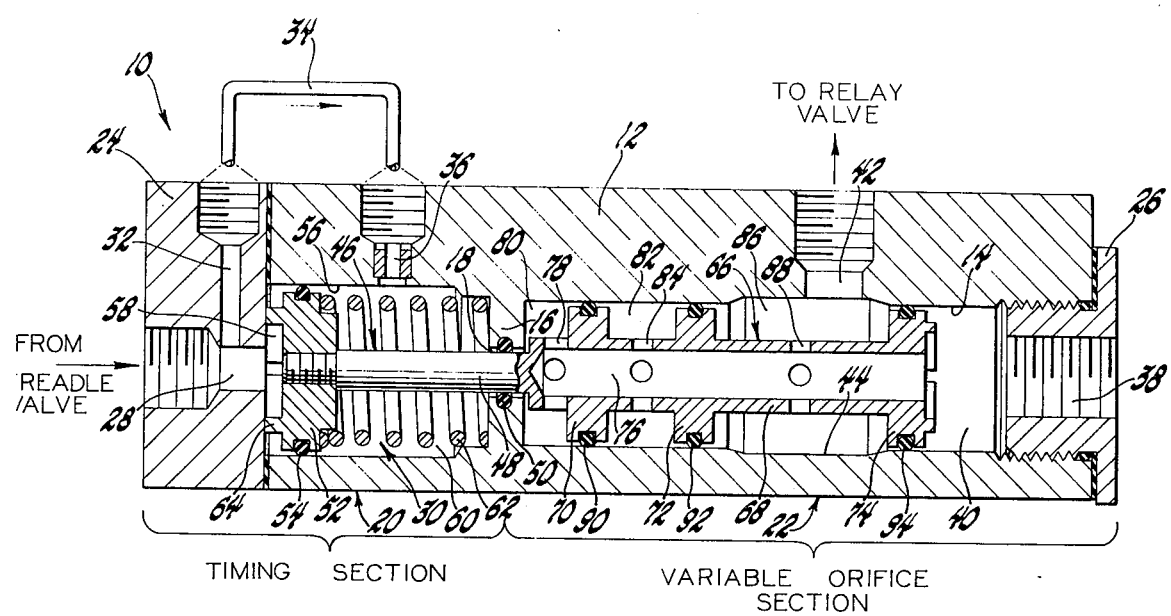
FIG. 1 is a cross section view with parts broken away of a valve assembly embodying the invention.

The dual rate valve assembly 10 includes a housing 12 provided with a bore 14. An interior portion of the bore has a wall 16 with an aperture 18 formed therethrough coaxially with the bore. The wall divides the bore so that a timing section 20 is at one end of the bore and a valve orifice section 22 is at the other end of the bore. The bore has an end covers 24 secured to the housing at the timing section end and an end cover or plug 26 secured to the housing at the variable orifice section end. End cover 24 has an inlet port 28 connecting with the chamber 30 defined by the bore timing section between wall 16 and end cover 24. A passage 32 in end cover 24 communicates with port 28 and a timing conduit or passage 34 is fluid connected with passage 32. Housing 12 has an orifice 36 therein communicating with a portion of chamber 30 axially spaced from end cover 24 and generally adjacent wall 16. Passage 34 is connected to orifice 36 so that fluid pressure at port 28 is communicated through passages 32 and 34 and orifice 36 to a portion of chamber 30 under restrictive influence of the orifice.

End cover 26 has an inlet 38 communicating with the outer end of bore 14, this portion of the bore being identified as chamber 40. A center portion of the variable orifice section of the valve assembly is provided with an outlet port 42, this center portion being an enlarged bore section 44.

The valve 46 is reciprocably received in bore 14 and has several valve sections. A valve shank 48 extends through aperture 18 in slidable sealing relation with a seal 50 provided in wall 16. The shank extends into chamber 30 and has a piston 52 on the end thereof adjacent end cover 24. The piston has a peripheral seal 54 which is in sliding sealing engagement with the bore portion 56. This bore portion is that part of the bore between end cover 24 and the point at which orifice 36 communicates with chamber 30. The piston therefore divides chamber 30 into chamber sections 58 and 60. Chamber 58 is adjacent end cover 24 and is in continuous fluid communication with inlet port 28. Chamber section 60 is adjacent wall 16 and is in continuous fluid communication with inlet port 28 through timing orifice 36. A compression biasing spring 62 in chamber section 60 is seated on wall 16 and piston 52 so that it continually urges the piston toward end cover 24. A castellated lip 64 is provided on piston 52 to engage end cover 24 as a piston stop while permitting fluid pressure in port 28 to be active against the entire piston area.

The valve 46 has a spool section 66 secured to or formed as a part of valve shank 48 and extending on the other side of wall 16 from piston 52. The spool section 66 forms a multiple chambered valve section and is constructed of a reduced diameter body 68 having spaced lands 70, 72 and 74 thereon. The body 68 has bore 76 extending therethrough with balance ports or orifices 78 continuously connecting the bore 76 with the chamber section 80. This chamber section is axially defined by wall 16 and land 70. The chamber section 82, axially defined by lands 70 and 72, is in continuous communication with bore 76 through orifices 84. The chamber section 86 is in continuous communication with bore 76 by orifices 88. Chamber section 86 is axially defined by lands 72 and 74. It also includes the enlarged bore section 44 and is in continuous fluid communication with outlet port 42. Bore 76 is in continuous fluid communication with inlet 38 through chamber 40. Chamber 40 is axially defined by end cover 26 and land 74. The lands 70, 72 and 74 are respectively provided with peripheral seals 90, 92 and 94. Seals 90 and 94 are always in sealing engagement with the wall of bore 14. When the valve is in the rest or low rate position shown in FIG. 1, seal 92 is also in sealing engagement with the wall of bore 14. It can be seen that when the valve is moved to the right as seen in FIG. 1, chamber sections 82 and 86 are in fluid communication around seal 92 because land 72 and seal 92 are positioned in the enlarged bore section 44 and the seal does not engage the bore wall.

Figure 2:
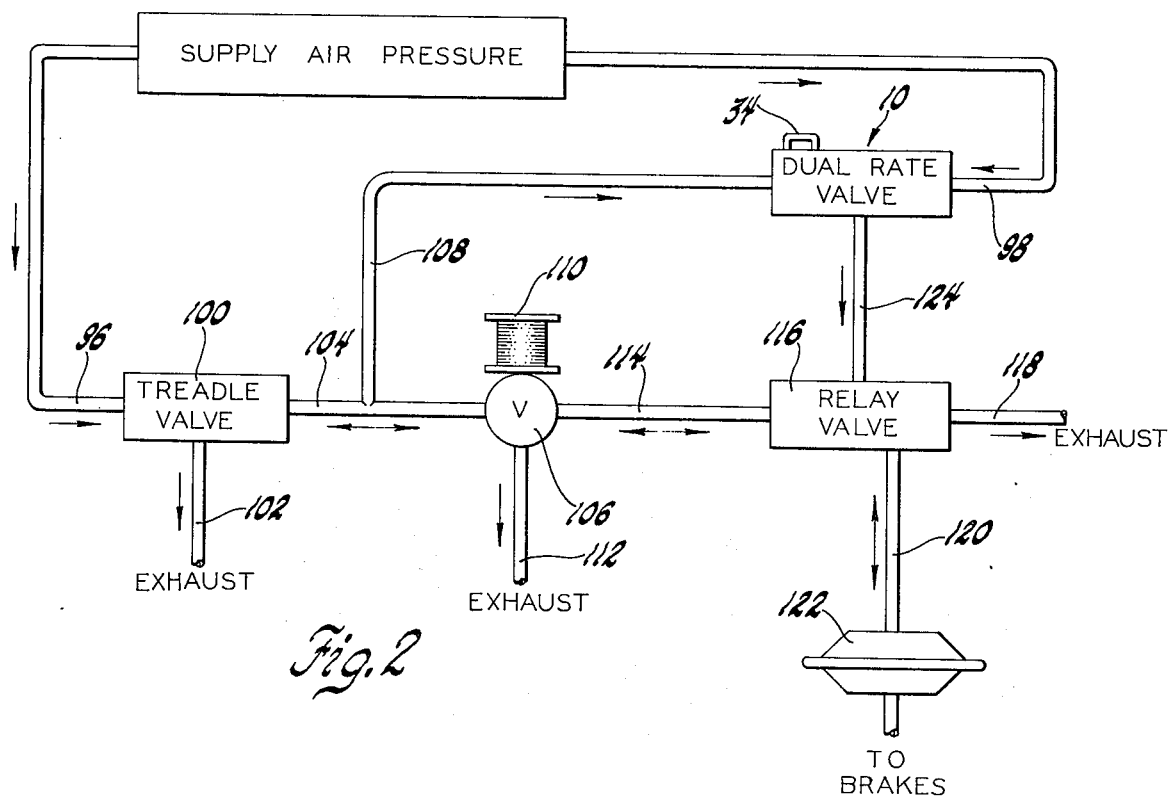
FIG. 2 is a schematic illustration of a portion of a brake system utilizing the valve assembly of FIG. 1.

The system shown in FIG. 2 schematically illustrates a truck air brake system. Supply air under pressure is furnished through conduits 96 and 98. Conduit 98 is connected with the inlet 38 of dual rate valve 10. A treadle valve 100, controlled by the vehicle operator, receives supply air from conduit 96. It has an exhaust 102 and a control pressure outlet conduit 104. The latter conduit communicates with the wheel lock control valve 106 and has a branch 108 which is connected to the inlet port 28 of dual rate valve 10. Valve 106 is schematically illustrated as being controlled by a solenoid 110 which is suitably actuated in a manner known in the art for wheel lock control. The valve has an exhaust 112 and is connected by conduit 114 to the relay valve 116. Valve 116 is provided with an exhaust 118 and is connected by a conduit 120 to the brake actuator 122. A conduit 124 connects the outlet port 42 of dual rate valve 10 with the supply input side of relay valve 116.

The valve assembly 10 is shown in FIG. 1 in the rest position which is also the low rate position. Supply air through conduit 98 is transmitted through the valve assembly 10 to conduit 124 only through orifices 88. These orifices establish the low rate required for efficient wheel lock control operation. This is the supply air pressure which is used to actuate brake actuator 122 when relay valve 116 is actuated under control of treadle valve 100. During normal brake operation supply air is always available to the treadle valve 100 through conduit 96 and to the relay valve 116 through conduit 98, valve assembly 10, and conduit 124. When the vehicle operator moves the treadle valve to apply the brakes, a control pressure is generated in conduit 104 and is transmitted through valve 106 and conduit 114 to the control side of relay valve 116. The relay valve is actuated in accordance with the control pressure to permit the desired amount of supply air through conduit 120 to brake actuator 122. During this initial operation, control pressure also passes through conduit 108 to inlet port 28 of the valve assembly 10. This pressure unrestrictedly enters chamber section 58, immediately acting on piston 52 to move valve 46 to the right against the force of spring 62. This movement is sufficient to position land 72 in the enlarged bore section 44, thereby also communicating supply air from inlet 38 to outlet port 42 through orifices 84 and chamber section 82. This portion of the supply air passes peripherally around land 72 and seal 92. The supply air is then connected to conduit 124 through parallel orifices so that its apply rate is at the initial high rate requirements.

The control pressure at port 28 also passes through passages 32 and 34 and restrictive orifice 36 and into chamber section 60. A somewhat slower build-up of pressure in chamber 60 occurs due to the restriction of orifice 36, the delay being on the order of 250 milliseconds before there is sufficient pressure in chamber 60 to counterbalance the pressure in chamber section 58 and permit biasing spring 62 to move the valve 46 back to the rest position shown. Supply air in bore 76 is provided in chamber section 80 at all times to balance the valve 46 so that the supply air in the variable orifice section does not affect the action of the timing section. The valve is exercised in this manner each time that the brake system is actuated above a minimum pressure rate, whether or not the wheel lock control valve 106 is actuated. When braking conditions are such that the wheel lock control system is operated, valve 106 closes its communication between conduits 104 and 114 and connects conduit 114 to exhaust 112. This causes relay valve 116 to close off conduit 124 and connect conduit 120 with exhaust 118, thereby releasing the brakes. This action is usually cyclic, and is the action which is most efficient at a maximum rate of pressure increase in actuator 122 of about 250 p.s.i./second. Therefore the low rate position of the valve 46, using only orifices 88, is designed to provide this maximum rate. The dual rate valve still provides for the minimum amount of initial pressure build-up response required by authorities which is on the order of 375 p.s.i./second. This is otained by utilizing orifices 84 and 88 during the initial response, but not so extending the initial response time as to adversely effect the wheel lock control operation if that operation is required upon initial brake application.

What is claimed is:

1. A dual rate air brake pressure control valve assembly comprising:

a housing having a bore therein provided with a control pressure inlet, a supply air pressure inlet, and a supply air pressure outlet adapted to be connected to a relay valve controlling the application and release of supply air pressure to an air pressure operated brake;

a multiple chambered valve assembly in said bore having a spring biasing said valve assembly toward a first position in said bore and cyclically movable therein under influence of control pressure supplied at said control pressure inlet from said first position to a second position and back to said first position;

said housing including a timing conduit connecting said control pressure inlet where pressure acts on one end of said valve assembly to a portion of said bore where pressure tends to balance said valve assembly sufficiently for said spring to move said valve assembly from said second position to said first position at a predetermined time interval of said cyclical movement independently of supply air pressure at said supply air pressure inlet and outlet;

said valve assembly having a plurality of orifice means therein with one of said orifice means providing fluid communication between said supply air pressure inlet and outlet with said valve assembly in said first and second positions and another of said orifice means providing fluid communication between said supply air pressure inlet and outlet with said valve assembly in said second position, but not when in said first position, so that a larger flow of supply air flows from said supply air pressure inlet to said supply air pressure outlet when said valve assembly is in said second position than when in said first position, only the control air flowing through said timing conduit and action of said biasing spring on said valve assembly determining the length of time said valve assembly is in said second position.

2. A dual rate fluid pressure control valve assembly comprising:

a housing having a body with a bore therein, an apertured wall in said bore dividing said bore into a timing chamber section and a variable orifice chamber section, first and second end covers with one at each end of said bore secured to said housing body and respectively having first and second fluid inlets communicating with said bore, a fluid outlet formed in said housing body and communicating with said variable orifice chamber section intermediate said wall and said second end cover, and a passage formed in said housing having an orifice therein and communicating with said timing chamber section and said first fluid inlet;

a piston and valve assembly reciprocably received in said bore and including a piston on one end thereof dividing said timing chamber section into two chamber subsections one of which is connected with said passage having an orifice therein and the other of which is connected with said first fluid inlet, a spool valve section having a bore extending axially therethrough and first and second and third lands spaced axially thereon and sealingly engageable with said bore to define therewith a first valve chamber axially intermediate said apertured wall and said first land and a second valve chamber between said first and second lands and a third valve chamber between said second and third lands and a fourth valve chamber between said third land and said second end cover, first and second and third orifices in said valve respectively communicating said first and second and third valve chambers with said valve bore which communicates with said fourth valve chamber, a valve shank sealingly extending through said apertured wall and joining said piston and said valve, and a compression spring in said bore acting on said piston and valve to continually urge said piston toward said first end cover;

said housing body bore having a circumferentially enlarged section with which said fluid outlet communicates, said valve having one position in which only said third orifice communicates said fluid outlet with said second inlet through said third valve chamber and said bore and another position wherein said second land is within the enlarged portion of said housing body bore with said second and third valve chambers communicating about the periphery of said second land whereby said second and third orifices communicate fluid outlet and said second inlet through said fourth valve chamber and said valve bore and said second and third valve chambers.

* * * * *